United States Patent
Rawal et al.

(10) Patent No.: US 10,399,711 B1
(45) Date of Patent: Sep. 3, 2019

(54) GRADED CARBON-CARBON COMPOSITES WITH AN INTEGRAL ABLATIVE LAYER AND METHODS FOR PRODUCTION THEREOF

(71) Applicant: LOCKHEED MARTIN CORPORATION, Bethesda, MD (US)

(72) Inventors: Suraj Prakash Rawal, Littleton, CO (US); William H. Willcockson, Morrison, CO (US); Wei Shih, Yorba Linda, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 730 days.

(21) Appl. No.: 14/668,913

(22) Filed: Mar. 25, 2015

Related U.S. Application Data

(60) Provisional application No. 61/970,840, filed on Mar. 26, 2014.

(51) Int. Cl.
*B64G 1/58* (2006.01)
*C04B 35/52* (2006.01)

(52) U.S. Cl.
CPC ............. *B64G 1/58* (2013.01); *C04B 35/52* (2013.01)

(58) Field of Classification Search
CPC .. B64G 1/58; C04B 35/52; H01B 1/04; H01B 1/24; Y10T 428/30
USPC .................... 428/408, 30; 165/185
See application file for complete search history.

(56) References Cited

U.S. PATENT DOCUMENTS

| 5,975,270 A | * | 11/1999 | Tokune | ............. F16D 13/64 192/107 M |
| 5,981,827 A | * | 11/1999 | Devlin | ............. C04B 41/85 623/23.51 |
| 2007/0205076 A1 | * | 9/2007 | Takahashi | ............. C04B 35/83 192/108 |

OTHER PUBLICATIONS

Manocha, "High performance carbon-carbon composites," Sadhana, 2003, 349-358, 28.

* cited by examiner

*Primary Examiner* — Travis M Figg
(74) *Attorney, Agent, or Firm* — Morgan Lewis & Bockius, LLP

(57) ABSTRACT

Laminated carbon-carbon composites can be used as an ablative material, but they are often prone to delamination under thermally induced interlaminar shear and tension. Graded carbon-carbon composites with a sacrificial or ablative layer that is integral with one or more underlying layers and not fully dense can address these issues and provide other advantages. Such graded carbon-carbon composites can include a densified base layer containing a first portion of a carbonaceous matrix, and an outer ablative layer that is integral with the densified base layer and contains a second portion of the carbonaceous matrix. The carbonaceous matrix in the densified base layer has a first porosity, and the carbonaceous matrix in the outer ablative layer has a second porosity that is higher than that of the densified base layer. Methods for forming graded carbon-carbon composites can include heating a partially densified base layer and a carbonaceous matrix precursor above a carbonization temperature.

10 Claims, 1 Drawing Sheet

GRADED CARBON-CARBON COMPOSITES WITH AN INTEGRAL ABLATIVE LAYER AND METHODS FOR PRODUCTION THEREOF

CROSS-REFERENCE TO RELATED APPLICATIONS

This application claims the benefit of priority under 35 U.S.C. § 119 from U.S. Provisional Patent Application 61/970,840, filed on Mar. 26, 2014 and incorporated herein by reference in its entirety.

STATEMENT REGARDING FEDERALLY SPONSORED RESEARCH OR DEVELOPMENT

Not applicable.

FIELD

The present disclosure generally relates to carbon-carbon composites, and, more specifically, to ablative materials formed from carbon-carbon composites and methods for their production.

BACKGROUND

A variety of heat shield concepts designed for minimizing heat transfer to a spacecraft structure during atmospheric reentry are known. Due to their high thermal stability, carbon-carbon composites are often used for this purpose. As used herein, the term "carbon-carbon composite" will refer to a composite material containing a discontinuous phase of carbon fibers in a pyrolytic or graphitized carbon matrix. To further increase the thermal protection attributes of carbon-carbon composites, a sacrificial ablative layer can also be present in a desired region of the composite by being layered thereon to form a laminated carbon-carbon composite. Such laminated carbon-carbon composites are often produced by fully densifying the underlying bulk carbon-carbon composite and then forming the sacrificial ablative layer in a separate curing cycle.

To densify a carbon-carbon composite, multiple densification cycles (typically 4-6 cycles) involving resin impregnation and subsequent carbonization are often performed. Each densification cycle reduces the total porosity of the composite, and after full densification, the total porosity of the composite may be about 8-10%. While laminated and densified carbon-carbon composites can often provide excellent thermal protection properties, the aerothermal environment of atmospheric reentry can often create extreme thermal gradients, especially through-thickness, within a laminated carbon-carbon composite. The high thermal gradients can induce various types of mechanical stress, such as interlaminar tension and interlaminar shear, which can lead to delamination and failure of a heat shield. In this regard, conventional laminated carbon-carbon composites can often exhibit relatively poor interlaminar tension (less than 1000 psi) and interlaminar shear properties (~1500 psi). Untimely delamination can lead to damage and potential loss of a reentry vehicle. Moreover, delamination can significantly impact the aerodynamic smoothness of a reentry vehicle's surface, which can sometimes undesirably impact the vehicle's reentry trajectory and maneuverability.

In view of the foregoing, methods for producing laminated carbon-carbon composites containing an ablative layer and that are more resistant to thermally induced stress in the underlying composite layers would be of significant interest in the art. The present disclosure satisfies these needs and provides related advantages as well.

SUMMARY

In various embodiments, the present disclosure describes ablative materials formed from graded carbon-carbon composites and methods for their production.

In some embodiments, graded carbon-carbon composites can include a densified base layer containing a first portion of a carbonaceous matrix, and an outer ablative layer that is integral with the densified base layer and contains a second portion of the carbonaceous matrix. The carbonaceous matrix in the densified base layer has a first porosity, and the carbonaceous matrix in the outer ablative layer has a second porosity that is higher than that of the densified base layer.

In some embodiments, methods for forming graded carbon-carbon composites can include: providing a partially densified base layer of a carbon-carbon composite; disposing a carbonaceous matrix precursor on the partially densified base layer; and heating the partially densified base layer and the carbonaceous matrix precursor above a carbonization temperature to form a graded carbon-carbon composite containing a densified base layer and an outer ablative layer. The partially densified base layer contains a first portion of a carbonaceous matrix. The outer ablative layer is integral with the densified base layer and contains a second portion of the carbonaceous matrix. The carbonaceous matrix in the densified base layer attains a first porosity and the carbonaceous matrix precursor forms a carbonaceous matrix with a second porosity in the outer ablative layer, in which the carbonaceous matrix in the outer ablative layer has a second porosity that is higher than that of the densified base layer.

The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
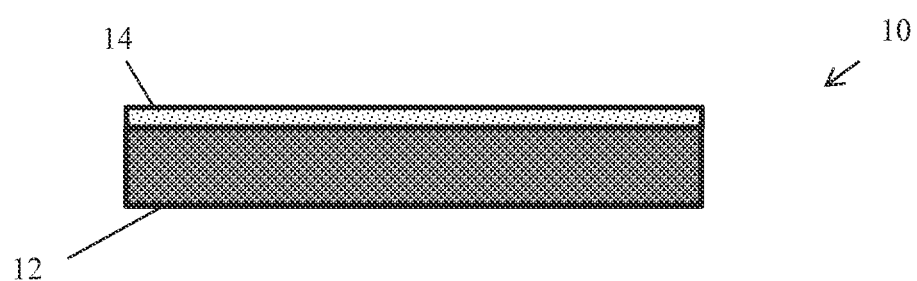
FIG. 1 shows an illustrative schematic of a graded carbon-carbon composite of the present disclosure.

The present disclosure is directed, in part, to graded carbon-carbon composites containing an outer sacrificial or ablative layer that is not fully densified. The present disclosure is also directed, in part, to methods for producing graded carbon-carbon composites containing an outer sacrificial or ablative layer that is not fully densified. In either case, the outer sacrificial or ablative layer is integral with the underlying composite layers, as discussed further hereinbelow.

As discussed above, at the heat flux levels characteristic of atmospheric reentry, thermally induced interlaminar tension and shear in laminated carbon-carbon composites can sometimes lead to their delamination. This can lead to a number of undesirable consequences, including damage to or loss of a reentry vehicle. In conventional laminated carbon-carbon composites, ablation of the composite can result in delamination due to the ablative layer being non-integral with the underlying layers of the bulk composite. As used herein, the term "non-integral" refers to the condition of a structural discontinuity existing between the carbonaceous matrix of an outer ablative layer and the carbonaceous matrix of one or more underlying layers in a carbon-carbon composite. That is, even when an ablative layer is adhesively connected or mechanically coupled to the underlying layers in a conventional carbon-carbon composite, there exists a union where the ablative layer and the underlying layers can be clearly delineated from one another by virtue of the carbonaceous matrix of the ablative layer not extending into that of the underlying layers. The interface between the ablative layer and the underlying layers can represent a structural weak point from which delamination can propagate, although it can still adequately endure thermal loads and provide sacrificial thermal protection to the underlying layers.

The present inventors recognized that by making a more robust interface between the ablative layer and the underlying layers in a carbon-carbon composite, delamination effects can be lessened in severity or averted entirely. By forming a robust ablative layer along the leading edge of the carbon-carbon composite, the ablative layer can absorb thermal energy generated upon atmospheric reentry while still maintaining interlaminar mechanical integrity. Accordingly, by increasing the robustness of the outer ablative layer according to the embodiments of the present disclosure, reentry vehicles can be afforded better thermal protection and more reliable aerodynamic performance can be attained.

More particularly, the present inventors developed carbon-carbon composites containing a robust outer ablative layer upon one or more base layers, also referred to herein as underlying layers, in which the carbonaceous matrix is integral between the outer ablative layer and the one or more base layers. As used herein, the term "integral" refers to the condition of the carbonaceous matrix in a carbon-carbon composite being continuous and lacking a structural discontinuity between an ablative layer and one or more underlying layers. By co-curing the carbonaceous matrix of the underlying layers and the outer ablative layer in the carbon-carbon composites of the present disclosure, a monolithic structure is created and the interface between the two layers is eliminated. By making the carbonaceous matrix continuous in the carbon-carbon composites of the present disclosure, there no longer exists a weak, discrete interface between the ablative layer and the base layer(s), from which delamination may commence in non-integral carbon-carbon composites. Instead, the carbon-carbon composites of the present disclosure are graded, such that the base layer(s) have a lower porosity than does the outer ablative layer. Such carbon-carbon composites will be referred to herein as "graded carbon-carbon composites" due to their gradient porosity distribution within a monolithic carbonaceous matrix. Accordingly, in the carbon-carbon composites of the present disclosure, the ablative layer can be identified as an outer region of the monolithic carbonaceous matrix having a higher porosity, and the base layer can be identified as an interior region of the monolithic carbonaceous matrix having a lower porosity.

Advantageously, the graded carbon-carbon composites of the present disclosure can be formed such that their base layer is fully densified and their ablative layer is not fully densified. As used herein, the term "fully densified" refers to the condition in which the porosity of a carbonaceous matrix is substantially unable to be decreased further through additional carbonization and resin infiltration cycles. In the present disclosure, a carbon-carbon composite can be considered to be fully densified if its porosity decreases by less than about 1% upon an additional resin infiltration and carbonization cycle. In contrast, the outer ablative layer of the present carbon-carbon composites is not fully densified, meaning that it can undergo a further decrease in porosity (e.g., greater than about a 5% decrease in porosity) upon resin infiltration and further carbonization. Carbonization can involve a pyrolysis process in which a carbonaceous matrix precursor, such as a phenolic resin, is heated above its carbonization temperature, such as a temperature above about 1000° C.

The present inventors discovered that graded carbon-carbon composites can be readily formed by co-curing (i.e., co-carbonizing) a partially densified base layer and a carbonaceous matrix precursor. As used herein, a substance that is "partially densified" or "not fully densified" refers to a carbon-carbon composite material that can undergo additional densification upon resin infiltration and further carbonization or curing. By forming or providing a partially densified base layer containing a partially carbonized carbonaceous matrix and then disposing a carbonaceous matrix precursor thereon, a continuous carbonaceous matrix can be formed upon carbonization, but with varying porosity states in different portions of the carbonaceous matrix. Specifically, the more extensively carbonized base layer can exhibit a lower porosity value than does the less extensively carbonized ablative layer formed from the carbonaceous matrix precursor. Most significantly, as the layers are carbonized together, the initial discontinuity between the layers disappears as the carbonaceous matrix from each layer is jointly carbonized into a continuous, monolithic structure having differing regional porosity values.

Moreover, there can also be an intermediate layer disposed between the base layer and the ablative layer while still maintaining a monolithic composite structure. Specifically, an intermediate layer can be formed on a partially densified base layer in a manner similar to that described above, and an ablative layer can then likewise be formed on the intermediate layer. When an intermediate layer is present, it can have a porosity value between that of the base layer and the ablative layer and provide for an alternative manufacturing method. Accordingly, the methods described herein can be extended to produce graded carbon-carbon composites having a continuous or integral carbonaceous matrix with any desired distribution of porosity values.

In more specific embodiments, graded carbon-carbon composites of the present disclosure can include a densified base layer containing a first portion of a carbonaceous matrix, and an outer ablative layer, integral with the densified base layer, containing a second portion of the carbonaceous matrix. The carbonaceous matrix in the densified base layer has a first porosity, and the carbonaceous matrix in the outer ablative layer has a second porosity that is higher than that of the densified base layer.

FIG. 1 shows an illustrative schematic of a graded carbon-carbon composite of the present disclosure. The graded carbon-carbon composite of FIG. 1 is configured as a panel. Other configurations are also possible, as will be recognized by one having ordinary skill in the art. As shown in FIG. 1, graded carbon-carbon composite 10 contains densified base layer 12 upon which outer ablative layer 14 is disposed. The carbonaceous matrix defining densified base layer 12 and outer ablative layer 14 is monolithic so that there is no discontinuity between the layers, only a difference in porosity values. In some embodiments, densified base layer 12 can be fully densified, and outer ablative layer 14 is not fully dense. Even in embodiments where densified base layer 12 is not fully densified, it can still be less porous than outer ablative layer 14, such that it has a first porosity lower than the second porosity of outer ablative layer 14.

In some embodiments, an intermediate layer can be present and disposed between the densified base layer and the outer ablative layer. The intermediate layer can also be integral with the densified base layer and the outer ablative layer. That is, a third portion of the carbonaceous matrix that is present in the intermediate layer can also be integral with the first portion of the carbonaceous matrix in the densified base layer and the second portion of the carbonaceous matrix in the outer ablative layer. Accordingly, the intermediate layer can also be part of a monolithic composite structure defined by the base layer and the ablative layer. The carbonaceous matrix in the intermediate layer can have a third porosity that is between that of the first porosity and the second porosity. In some embodiments, the densified base layer can be fully densified, and the intermediate layer and the outer ablative layer can be less than fully densified.

Figure 2:
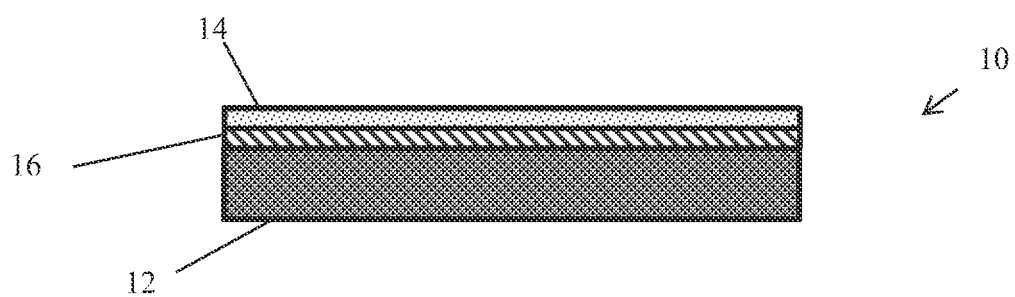
FIG. 2 shows an illustrative schematic of a graded carbon-carbon composite of the present disclosure in which an intermediate layer is present.

FIG. 2 shows an illustrative schematic of a graded carbon-carbon composite of the present disclosure in which intermediate layer 16 is present. As the other reference characters in FIG. 2 are substantially similar to those of FIG. 1, they will not be described in detail again in the interest of brevity.

In more particular embodiments, the densified base layer can have a total porosity value of about 10% or less. As used herein, the "total porosity value" will represent the sum of the "closed porosity value" and the "open porosity value." As used herein, the term "closed porosity value" will refer to the void fraction of a carbon-carbon composite or a portion thereof that cannot be infiltrated with resin or another fluid. The term "open porosity," in contrast, will refer to the void fraction of a carbon-carbon composite or a portion thereof that can be further infiltrated with resin or another fluid. In a fully densified composite layer, the closed porosity term dominates, whereas in a layer that is not fully densified, both porosity values can contribute, with the open porosity term dominating at higher porosity values.

In more specific embodiments, the densified base layer can have a total porosity value of about 8% or less, and a closed porosity value of about 2% to about 5%. In still more particular embodiments, the densified base layer can have a total porosity value of about 1% to about 8%, or about 2% to about 6%. Accordingly, the closed porosity value term can dominate the total porosity of the densified base layer.

The outer ablative layer can have much higher total porosity values, in contrast. In some embodiments, the outer ablative layer can have a total porosity of about 10% or more. In more specific embodiments, the outer ablative layer can have a total porosity value of about 20% to about 40%. In still more particular embodiments, the outer ablative layer can have a total porosity value of about 25% to about 35%.

As indicated above, the outer ablative layer can have a total porosity value that is dominated by the open porosity term. Accordingly, the total porosity value of the outer ablative layer approximates the total void fraction that can be infiltrated by a carbonaceous matrix precursor in order for the layer to be further densified, but not fully densified, according to the various embodiments of the present disclosure. As described further below, the outer ablative layer can be infiltrated with a carbonaceous matrix precursor, such as a phenolic resin, and densified through repeated cycles of heating above the carbonization temperature and infiltrating with additional resin. Following the final heating cycle and infiltration operation, the infiltrated carbonaceous matrix precursor can remain in the open porosity of the outer ablative layer, if desired. By maintaining unmodified (i.e., non-carbonized) carbonaceous matrix precursor in the open porosity of the outer ablative layer, the carbonaceous precursor can undergo carbonization during atmospheric reentry to afford further thermal protection by forming additional carbonaceous matrix. In other embodiments, a final carbonization cycle can be performed.

Accordingly, in more specific embodiments, the graded carbon-carbon composites of the present disclosure can further include an uncarbonized carbonaceous matrix precursor, such as a phenolic resin, in the outer ablative layer. Although other carbonaceous matrix precursors are known and available and can be used in the various embodiments of the present disclosure, phenolic resins are by far the industry standard. In various embodiments, an amount of uncarbonized phenolic resin in the outer ablative layer can be about 10% or above, or about 20% or above, or about 30% or above. In more particular embodiments, the outer ablative layer can include about 20% to about 50% uncarbonized phenolic resin, or about 20% to about 40% uncarbonized phenolic resin, or about 30% to about 40% uncarbonized phenolic resin, or about 20% to about 35% uncarbonized phenolic resin. These values are representative of the open porosity value of the outer ablative layer.

In general, any phenolic resin can be used in practicing the various embodiments of the present disclosure. The base layer and the outer ablative layer can be formed from phenolic resins that are the same or different. Phenolic resins are well-known in the art and include various reaction products of phenol with simple aldehydes like formaldehyde. For example, phenolic resins can be prepared by reacting a molar excess of phenol with an aldehyde in the presence of an acid catalyst, which can result in an uncured solid resin that can be further crosslinked with a suitable crosslinking agent (e.g., a polyamine such as hexamethylenetetramine). The phenolic resin can be in solid particle or powder form in some embodiments.

One example of a solid phenolic resin that can be used in the embodiments of the present disclosure is a Novalac-type phenolic powder resin DURITE® FD-2170 made by Hexion. In some embodiments, at least a portion of the phenolic resin can be in the form of phenolic resin microballoons or microspheres, such as PHENOSET® microspheres made by Asia Pacific Microspheres.

In other illustrative embodiments of the present disclosure, the phenolic resin can be in a liquid form. Liquid form phenolic resins can be prepared by reacting a molar excess of aldehyde with phenol in the presence of an alkaline catalyst and terminating the reaction prior to the commencement of substantial crosslinking. The reaction of liquid phenolic resin is then carried to completion, including crosslinking, during thermal curing. In some embodiments, a liquid phenolic resin and a crosslinking agent can be dissolved in a solvent for infiltration within the pores of the outer ablative layer. The solvent can then be evaporated before the phenolic resin undergoes carbonization to form the carbonaceous matrix.

Examples of liquid phenolic resins that can be used in the embodiments of the present disclosure are commercially available liquid phenolic resins such as SC1008 phenolic resin from Hexion and FM5055 phenolic resin. For atmospheric reentry applications, the latter phenolic resin can be especially desirable. In addition, dilute solvent solutions of these phenolic resins can be readily formed and used for infiltration.

In some embodiments, a plurality of fibers can be included in the densified base layer and the outer ablative layer. In some embodiments, the plurality of fibers can be a fabric. Suitable fabrics that can be included in the densified base layer and the outer ablative layer of the graded carbon-carbon composites include, but are not limited to, carbon fiber fabrics, polytetrafluoroethylene fabrics, rayon fabrics, and carbon fiber veils. Illustrative carbon fiber fabrics can include, for example, T300-3K (Toray Carbon Fibers America) and SWB8. In various embodiments, suitable fabrics for the outer ablative layer can have a fiber volume between about 30% and about 70%, or between about 40% and about 60%, with the remaining volume fraction representing the porosity of the fabric. As discussed below, the porosity of the fabric can be used for delivering or containing a carbonaceous matrix precursor when forming the outer ablative layer via a pre-preg strategy.

The plurality of fibers in the densified base layer and the outer ablative layer can be the same or different depending on the specific conditions to which the graded carbon-carbon composite will be exposed. Similarly, a quantity of the fibers in each layer can be the same or different. In various embodiments, a fiber volume in the layers can range between about 30% to about 55%.

In some embodiments, lightweight, heat-tolerant fillers can optionally be incorporated within the outer ablative layer in order to reduce the layer density. Suitable lightweight, heat-tolerant fillers can include silica microballoons, carbon foam, carbon aerogels, and the like. When present, an amount of the lightweight, heat-tolerant filler can range between about 0.01% to about 40% by weight.

Generally, the outer ablative layer is relatively thin in comparison to the thickness of the base layer. For example, in some embodiments, the outer ablative layer can have a thickness ranging between about 0.01 inches and about 0.1 inches, more typically between about 0.01 inches and about 0.03 inches. Even at these small thickness values, the outer ablative layer can provide thermal protection to the base layer during atmospheric reentry and other thermally intense conditions. The thickness of the outer ablative layer can be tailored and defined for a specific environment and application in order to convey a desired degree of thermal protection. The base layer, in contrast, can be much thicker than the outer ablative layer and constitute the bulk of the structure formed from the carbon-carbon composite. In general, any shape, thickness or configuration of the base layer can be used, provided that it can be effectively formed and densified to meet the needs of a particular application. In further embodiments, the outer ablative layer can be feathered or polished to provide aerosmoothness, as needed for a particular application.

In other various embodiments, methods for forming graded carbon-carbon composites are provided by the present disclosure. In some embodiments, the methods can include: providing a partially densified base layer of a carbon-carbon composite; disposing a carbonaceous matrix precursor on the partially densified base layer; and heating the partially densified base layer and the carbonaceous matrix precursor above a carbonization temperature to form a graded carbon-carbon composite containing a densified base layer and an outer ablative layer. The partially densified base layer contains a first portion of a carbonaceous matrix. The outer ablative layer is integral with the densified base layer and contains a second portion of the carbonaceous matrix. Upon heating, the carbonaceous matrix in the densified base layer attains a first porosity and the carbonaceous matrix precursor forms a carbonaceous matrix with a second porosity in the outer ablative layer, in which the carbonaceous matrix in the outer ablative layer has a second porosity that is higher than that of the densified base layer.

In illustrative embodiments, a carbonization temperature suitable to convert a carbonaceous matrix precursor to a carbonaceous matrix can be about 1000° C. or above. Heating at or above this temperature can ensure that decomposition of the carbonaceous matrix precursor (e.g., a phenolic resin) fully takes place through pyrolysis. In other embodiments, a suitable carbonization temperature can range between about 350° C. and about 1000° C., or between about 400° C. and about 900° C. These lower carbonization temperatures can be used if slower pyrolysis of the carbonaceous matrix precursor is desired. Illustrative carbonization conditions for a particular carbonaceous matrix precursor will be familiar to one having ordinary skill in the art.

In some embodiments, heating the partially densified base layer and the carbonaceous matrix precursor can involve one or more heating cycles above the carbonization temperature. Following each heating cycle, the methods can further include infiltrating at least the outer ablative layer with phenolic resin or another suitable carbonaceous matrix precursor. In some embodiments, the base layers can also be at least partially further infiltrated with the carbonaceous matrix precursor in this process. In some embodiments, a final heating cycle can be conducted to carbonize the carbonaceous matrix precursor in order to prepare the graded carbon-carbon composite for use. In other embodiments, the uncarbonized carbonaceous matrix precursor can remain in the pores of the outer ablative layer when the graded carbon-carbon composite is deployed in a given application.

In general, the carbonaceous matrix in the densified base layer undergoes a greater number of heating (carbonization) cycles than does the carbonaceous matrix in the outer ablative layer. In various embodiments, the carbonaceous matrix in the partially densified base layer undergoes at least one heating cycle before the carbonaceous matrix precursor is disposed thereon. Accordingly, in various embodiments of the present disclosure, the carbonaceous matrix of the densified base layer undergoes at least one more heating cycle than does the carbonaceous matrix of the outer ablative layer. In more particular embodiments, the carbonaceous matrix of the densified base layer can undergoe at least two more heating cycles than does the carbonaceous matrix of the outer ablative layer. For example, if the base layer is partially densified with two heating cycles before the carbonaceous matrix precursor of the outer ablative layer is applied, and if the outer ablative layer is heated above a carbonization temperature twice, the base layer will have undergone four heating cycles in total.

In various embodiments, the total number of heating cycles can be chosen such that the base layer is fully densified and the outer ablative layer is not fully densified. A suitable number of curing cycles to attain these states can be determined by one having ordinary skill in the art. For example, if one prepares a partially densified base layer and determines that two further heating cycles are needed to attain a state of full densification, the heating cycles can be performed to fully densify the base layer and leave the outer ablative layer partially densified. Conversely, if one prepares a partially densified base layer and determines that a number of heating cycles needed to fully densify this layer is greater than the number of heating cycles needed for fully densifying the outer ablative layer, fewer heating cycles may need to be performed in order to leave the outer ablative layer with a higher porosity than the base layer, even if doing so would leave the base layer less than fully densified. In such instances, the partially densified base layer can be provided with a greater extent of initial densification (more initial heating cycles before application of the carbonaceous matrix precursor), such that the base layer attains full densification before the outer ablative layer.

In various embodiments, at least one heating cycle is performed to provide the partially densified base layer before applying the carbonaceous matrix precursor of the outer ablative layer. In more particular embodiments, two heating cycles, three heating cycles, or four heating cycles are performed to provide the partially densified base layer before applying the carbonaceous matrix precursor of the outer ablative layer. Again, the proper number of heating cycles to be initially performed on the base layer can be determined by one having ordinary skill in the art and the benefit of the present disclosure.

After obtaining a partially densified base layer, as described above, the carbonaceous matrix precursor of the outer ablative layer, potentially containing a plurality of fibers, can be applied and additional heating and carbonaceous matrix precursor infiltration operations can be performed. In general, two or more heating cycles are performed when generating the outer ablative layer from the carbonaceous matrix precursor. For example, beginning from a partially densified base layer that has undergone two heating cycles, and performing two additional heating cycles to form the outer ablative layer, provides a total of four heating cycles to the base layer. Similarly, beginning from a partially densified base layer that has undergone four heating cycles, and performing two additional heating cycles to form the outer ablative layer, provides a total of six heating cycles to the base layer. Again, the totality of the heating cycles can, in some embodiments, be sufficient to affect full densification of the base layer while leaving the outer ablative layer not fully densified. In any event, the total number of heating cycles and the number of heating cycles to which each layer is exposed may be chosen such that the outer ablative layer has a second porosity that is higher than the first porosity of the densified base layer. In the case of a fully densified base layer, the outer ablative layer can remain less than fully densified.

The outer ablative layer can be prepared by disposing a plurality of fibers (e.g., a fabric) containing or formed from a carbonaceous matrix precursor. For example, a carbon fiber fabric or carbon fiber veil can be saturated with a phenolic resin and then applied to a partially densified base layer through a lay up process. Upon heating the newly deposited layer above a carbonization temperature, the phenolic resin can fuse with the carbonaceous matrix in the partially densified base layer to form a monolithic structure containing the base layer and an outer ablative layer, in which the two layers are integral with one another. Thereafter, at least the outer ablative layer can be infiltrated with further phenolic resin and densified through one or more additional heating cycles as described above.

In other various embodiments, a powder coating of the carbonaceous matrix precursor can be applied to the partially densified base layer in the presence of a carbon fiber veil in order to form the outer ablative layer. For example, a powder coating of a phenolic resin can be brushed onto the surface of the partially densified base layer, and a carbon fiber veil can then be applied to hold the powder coating in place. After heating the powder coating above the carbonization temperature of the phenolic, a liquid phenolic resin can then be used for further infiltration, as described above.

As discussed above, the graded carbon-carbon composites of the present disclosure can also contain an intermediate layer present between the densified base layer and the outer ablative layer. The intermediate layer can have a third porosity that is between the first porosity of the densified base layer and the second porosity of the outer ablative layer. Graded carbon-carbon composites containing an intermediate layer can be prepared through an extension of the methods described hereinabove.

More specifically, a graded carbon-carbon composite containing an intermediate layer can be prepared by disposing a carbonaceous matrix precursor on a partially densified base layer and then performing one or more heating cycles, as described above. This action produces a monolithic structure similar to that of a graded carbon-carbon composite lacking an intermediate layer, as generally described above. That is, a monolithic structure containing a base layer containing a carbonaceous matrix and an intermediate layer containing a carbonaceous matrix can be obtained, where co-carbonization of the two layers occurs such that they are integral with one another. Additional carbonaceous matrix precursor can then be disposed upon the intermediate layer and additional heating cycles can then be performed to co-carbonize the base layer, the intermediate layer and the outer ablative layer. Accordingly, the base layer, the intermediate layer and the outer ablative layer each undergo different numbers of heating cycles, such that each layer exhibits a different porosity value. For example, in some embodiments, the base layer can undergo six total heating cycles, the intermediate layer can undergo four total heating cycles, and the outer ablative layer can undergo two heating cycles. The foregoing listing of heating cycles is merely illustrative, and depending upon the particular deployment situation for a given graded carbon-carbon composite, other heating cycle protocols can also be performed in order to achieve particular properties in the composite structure. In any event, the intermediate layer is also heated above the carbonization temperature along with the partially densified base layer and the carbonaceous matrix precursor of the outer ablative layer, such that the intermediate layer becomes integral with the densified base layer and the outer ablative layer following heating above the carbonization temperature. As a result, the carbonaceous matrix in the intermediate layer has a third porosity between the first porosity and the second porosity.

Although the disclosure has been described with reference to the disclosed embodiments, those skilled in the art will readily appreciate that these only illustrative of the disclosure. It should be understood that various modifications can be made without departing from the spirit of the disclosure. The disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description.

What is claimed is the following:

1. A graded carbon-carbon composite comprising:
   a densified base layer comprising a first portion of a carbonaceous matrix, the carbonaceous matrix in the densified base layer having a first porosity;

an outer ablative layer, integral with the densified base layer, comprising a second portion of the carbonaceous matrix, the carbonaceous matrix in the outer ablative layer having a second porosity that is higher than that of the densified base layer; and an uncarbonized carbonaceous matrix precursor in the outer ablative layer, wherein both the densified based layer and the uncarbonized carbonaceous matrix precursor comprises a phenolic resin, and the outer ablative layer comprises about 20% to about 40% uncarbonized phenolic resin.

2. The graded carbon-carbon composite of claim 1, wherein the densified base layer is fully densified.

3. The graded carbon-carbon composite of claim 2, wherein the densified base layer has a closed porosity value of about 2% to about 5% and a total porosity value of about 8% or less.

4. The graded carbon-carbon composite of claim 2, wherein the outer ablative layer has a total porosity value of about 20% to about 40%.

5. The graded carbon-carbon composite of claim 4, wherein the outer ablative layer has a total porosity value of about 25% to about 35%.

6. The graded carbon-carbon composite of claim 2, further comprising:

an intermediate layer, integral with the densified base layer and the outer ablative layer and disposed therebetween, comprising a third portion of the carbonaceous matrix, the carbonaceous matrix in the intermediate layer having a third porosity between the first porosity and the second porosity.

7. The graded carbon-carbon composite of claim 1, further comprising:

a plurality of fibers in the densified base layer and the outer ablative layer.

8. The graded carbon-carbon composite of claim 1, wherein the outer ablative layer has a thickness ranging between about 0.01 inches and about 0.1 inches.

9. A graded carbon-carbon composite comprising:

a densified base layer comprising a first portion of a carbonaceous matrix, the carbonaceous matrix in the densified base layer having a first porosity;

an outer ablative layer, integral with and layered above the densified base layer, comprising a second portion of the carbonaceous matrix, the carbonaceous matrix in the outer ablative layer having a second porosity that is higher than that of the densified base layer; and an intermediate layer, integral with the densified base layer and the outer ablative layer and layered therebetween, the intermediate layer being layered above the densified base layer and below the outer ablative layer and comprising a third portion of the carbonaceous matrix, the carbonaceous matrix in the intermediate layer having a third porosity between the first porosity and the second porosity.

10. The graded carbon-carbon composite of claim 9, wherein the densified base layer is fully densified.

* * * * *